Figure 1A:
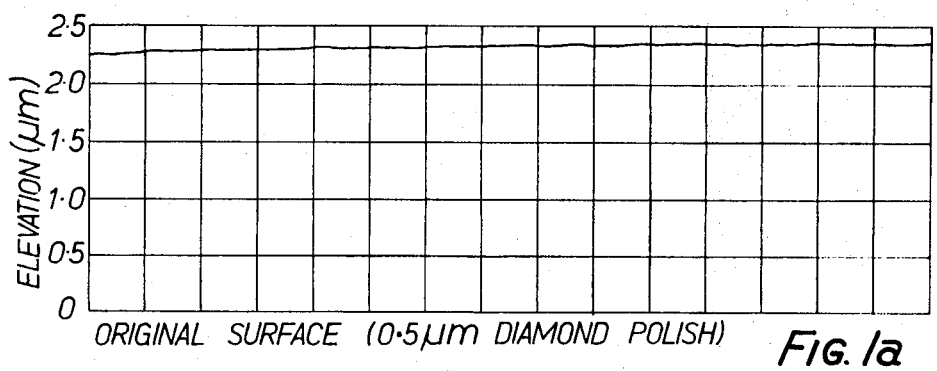

United States Patent

[11] 3,619,309

| [72] | Inventors | Marc Marian Faktor<br>Bushey;<br>George Reginald Newns, Ealing, London;<br>Dennis Gordon Fiddyment, London, all of<br>England |
|---|---|---|
| [21] | Appl. No. | 700,898 |
| [22] | Filed | Jan. 26, 1968 |
| [45] | Patented | Nov. 9, 1971 |
| [73] | Assignee | Her Majesty's Postmaster General<br>London, England |
| [32] | Priority | Feb. 3, 1967 |
| [33] | | Great Britain |
| [31] | | 5,347/67 |

[54] TREATMENT OF ALUMINUM OXIDE SURFACES WITH MOLTEN VANADIUM PENTOXIDE
12 Claims, 6 Drawing Figs.

[52] U.S. Cl. .................................................. 156/2,
156/6, 23/51, 23/52
[51] Int. Cl. ...................................................... C23f 1/04,
C23g 1/00
[50] Field of Search ............................................ 23/141, 51,
143, 52; 156/26; 148/6.11

[56] References Cited
UNITED STATES PATENTS
2,510,219  6/1950  Graham........................ 156/2

OTHER REFERENCES

P. H. Robinson et al., " The Deposition of Silicon upon Saphire Substrates" Trans. of the Metallurgical Soc. of AIME, Vol. 236, Mar., 1966, pp. 268– 274 cited.

Fink, " Reaction of $V_2O_5$ with aluminia Berichte, Nov., 1964, pp. 627– 631.

Rostoker, " The Metallurgy of Vanadium," pps. 52, 53 and 60 cited, published 1958.

Anderson, " Studies on Vanadium Oxides," Acta Chemica Scandnavica, Aug., 1954; No. 9, pp. 1,599– 1,606 cited.

*Primary Examiner*—Robert F. Burnett
*Assistant Examiner*—R. J. Roche
*Attorney*—Hall and Houghton ABSTRACT: Surface irregularities of a crystalline aluminum oxide member, such as an α-corundum crystal, are removed by treatment with molten vanadium pentoxide, preferably at temperatures exceeding 800° C. The treatment may be carried out in more than one stage, using a fresh vanadium pentoxide melt in each stage.

HORIZONTAL SCALE: 1 DIVISION = 0.1mm

3,619,309

TREATMENT OF ALUMINUM OXIDE SURFACES WITH MOLTEN VANADIUM PENTOXIDE

This invention relates to improving the surface properties of crystalline forms of aluminum oxide.

The present invention provides a process for the treatment of crystalline aluminum oxide which comprises contacting at least one surface of a crystalline aluminum oxide member with molten vanadium pentoxide in such manner that a portion of the surface is removed.

More especially, the present invention provides a process for the production of a clean polished surface on a crystalline form of aluminum oxide, especially $\alpha$-corundum, which comprises polishing said surface, more especially lapping and mechanical polishing by abrasives, and subsequently contacting said surface with molten vanadium pentoxide so as to remove the surface to a sufficient depth that underlying scratches and regions of strain and disorder are substantially removed.

Advantageously the process of the invention is carried out with the molten vanadium pentoxide at a temperature in the range of from 800° to 1,000° C.

In the preferred form of the invention in which the process is applied to the production of a clean polished surface, the surface of the already polished aluminum oxide is preferably immersed in molten vanadium pentoxide for a period of from 15 minutes to 2 hours and is kept stationary without agitation of the melt. The specimen may be rotated but it has been found that, although rotation causes more rapid removal of a given depth of surface, the resulting surface is less smooth than the surface produced when the crystalline specimen is kept stationary.

Optical assessment and microprofilometer (Talysurf) measurements show that the initial surface after mechanical polishing, although smooth, possesses numerous scratches. As dissolution takes place the scratches widen and become more marked and then disappear, leaving a substantially featureless surface after a sufficient depth of surface has been removed. In experiments with $\alpha$-corundum it was found that removal of about 30 $\mu$m. of the surface of the aluminum oxide was necessary before the rate of removal became constant, indicating that the underlying scratches and regions of disorder had been removed. As further surface is removed the resulting surfaces become somewhat striated in appearance, although the microprofilometer shows no roughening.

The rate of removal of surface increases with the melt temperature, but a higher melt temperature also increases the degree of striation on the resulting surfaces. It was found that for $\alpha$-corundum the removal of a depth of 30 $\mu$m. took about 1 hour at 800° C., about 30 minutes at 900° C. and about 15 minutes at 1,000° C.

Increased concentration of alumina in the melt reduces the rate of dissolution considerably and for this reason it is advantageous, when it is desired to remove substantial depths of surface, to carry out the process of the invention in a plurality of stages in each of which a fresh vanadium pentoxide melt is employed.

It has been found that the removal of a given depth of surface, no matter how it is effected so far as temperature, time of immersion and alumina concentration in the melt are concerned, produces a similar degree of smoothness as assessed by a microprofilometer.

A pale violet film appears on some surfaces after immersion in the melt. This film is in general resistant to chemical attack although there are slight changes in its appearance after treatment with concentrated hydrochloric nitric or hydrofluoric acids, or a solution of catechol in hydrazine hydrate. The films disappear after prolonged heating in air at 1,200° C.

In some industrial applications, it is important that crystalline forms of aluminum oxide should have a clean polished surface free from work damage. For example, it is advantageous for $\alpha$-corundum to have such a surface for the epitaxial deposition of thin films of silicon. Highly polished surfaces produced by lapping and polishing with abrasives, however fine, have underlying scratches and associated regions of strain and disorder beneath the surface which may adversely influence the deposit.

For the production of a polished clean surface on a crystalline specimen of aluminum oxide, the specimen is advantageously lapped and mechanically polished with a final abrasive of diamond dust having a particle size in the range of from 0.2 $\mu$m. to 0.8 $\mu$m., for example, about 0.5 $\mu$m., in the process of the invention. The specimen is then suspended from a fine platinum wire and immersed slowly in a crucible of molten vanadium pentoxide at a temperature in the range of from 800° to 1,000° C. It is kept stationary for from 15 minutes to 2 hours, removed and allowed to cool slowly to avoid thermal shock. The residual vanadium pentoxide is then removed from the specimen by immersion in hot concentrated hydrochloric acid and the specimen is washed in distilled water and alcohol and finally dried in air.

It is to be understood that references to crystalline forms of aluminum oxide throughout this specification include those forms, for example, ruby and sapphire, which contain traces of other materials, for example, metal oxides.

The following example illustrates the invention:

EXAMPLE

A 1 cm.$^2$ wafer of $\alpha$-corundum was cut about 1 mm. thick from a large Verneuil-grown single crystal, perpendicular to the c–axis. Each face was lapped and polished with a final abrasive of 0.5 $\mu$m. diamond dust. The specimen was then cleaned by washing with distilled water followed by ethyl alcohol, dried in hot air at about 60° C. and weighed.

The specimen was then immersed and kept stationary in an unstirred melt of vanadium pentoxide at 800° C. After 2 minutes, it was removed from the vanadium pentoxide melt, allowed to cool, cleaned of solidified vanadium pentoxide by immersion in hot concentrated hydrochloric acid, washed in distilled water and alcohol, dried in air and finally weighed. It was found from the loss in weight that a depth of surface equal to 1.5 $\mu$m. had been removed.

The results of a series of similar experiments carried out on other identically prepared crystalline specimens are shown in table 1. The results show that, other conditions being equal, the greater the temperature the greater is the depth of surface removed, and also that the rate of removal of surface is retarded by an increased concentration of alumina in the melt.

Figure 1B:
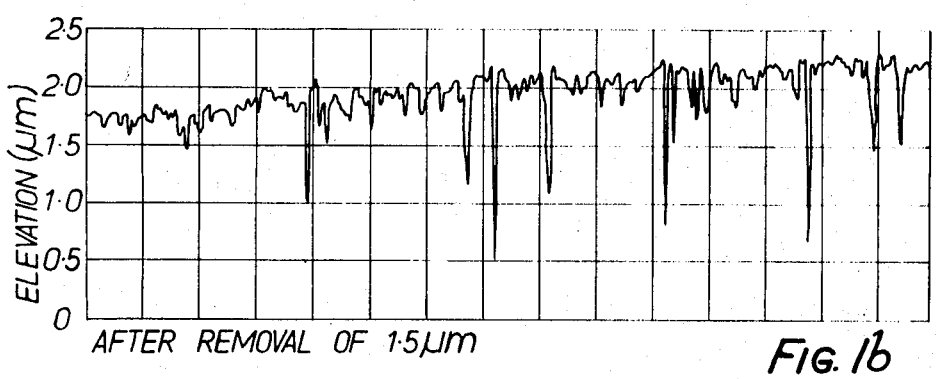
Figure 1C:
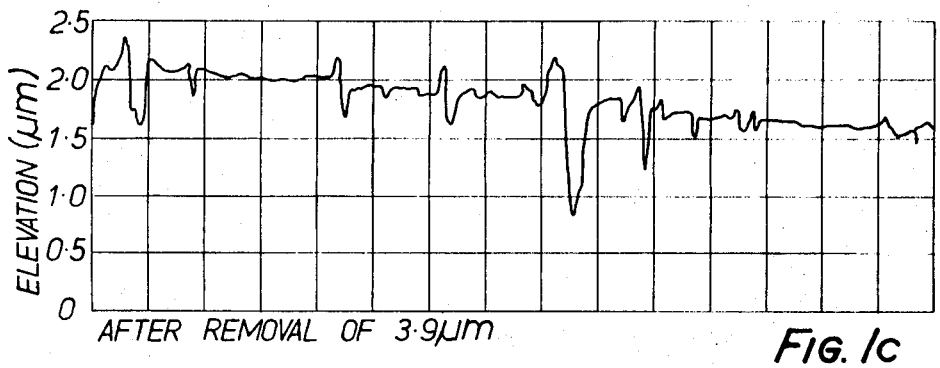
Figure 1D:
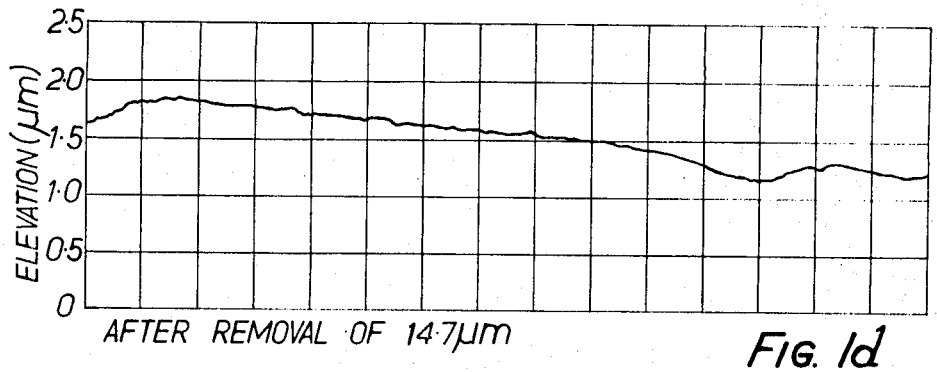
Figure 1E:
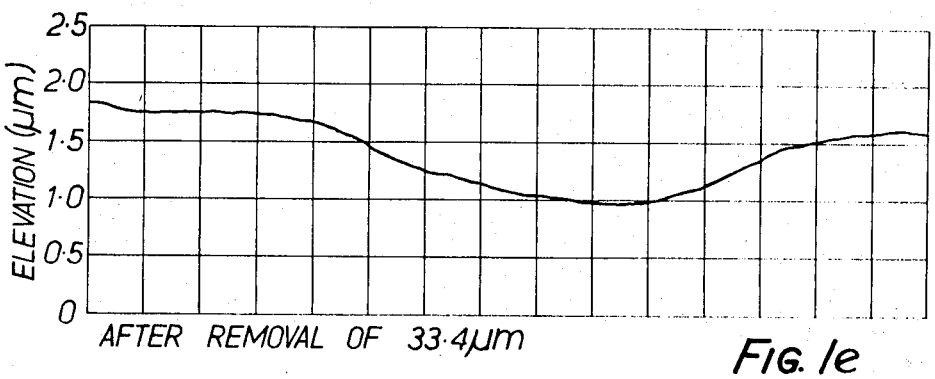
Figure 1F:
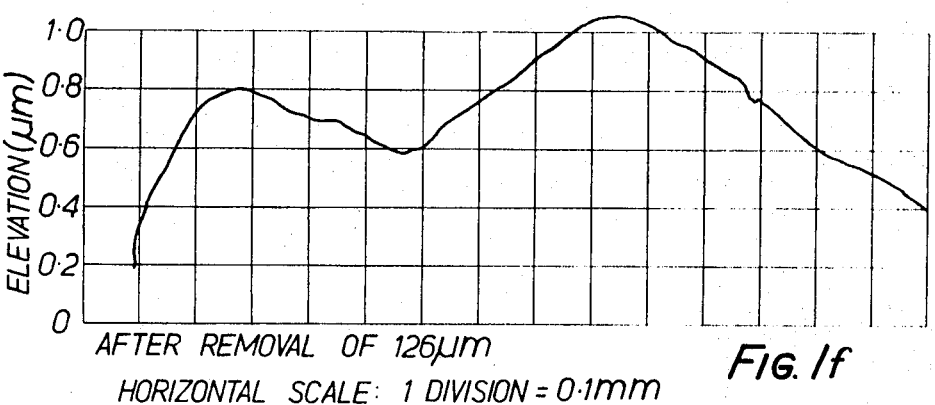

In FIG. 1 of the accompanying drawings traces ($a$) to ($f$) are microprofilometer (Talysurf) assessments of the original surface ($a$) and the surface of some of the crystalline specimens after the removal, in the above series of experiments, of a depth of surface of 1.5 $\mu$m. ($b$), 3.9 $\mu$m. ($c$), 14.7 $\mu$m. ($d$), 33.4 $\mu$m. ($e$) and 126 $\mu$m. ($f$).

TABLE 1

| Temperature of vanadium pentoxide melt, ° C. | Total time of immersion of crystal | Depth of surface removed, $\mu$m | Remarks |
|---|---|---|---|
| 800 | 2 mins. | 1.5 | |
| 800 | 2 hours | 3.0 | Melt contained dissolved alumina. |
| 900 | 2 mins. | 3.9 | |
| 900 | 10 mins. | 10 | |
| 900 | 12 mins. | 14.7 | |
| 900 | 32 mins. | 33.4 | |
| 800 | 5 hr. 2 mins. | 52.0 | One-stage immersion. Alumina in melt allowed to accumulate. |
| 900 | 1 hr. 30 mins. | 108 | Three immersions of 30 minutes each, using a fresh vanadium pentoxide melt for each immersion. |
| 900 | 3 hr. 2 mins. | 126 | Four immersions of 2 minutes, 10 minutes, 20 minutes and 150 minutes duration, using a fresh vanadium pentoxide melt for each immersion. |

We claim:

1. A process for the treatment of crystalline aluminum oxide in which at least one surface of a crystalline aluminum oxide member is contacted with a vanadium pentoxide melt having a temperature in the range of from 800° C. to 1,000° C., the contacting being continued at least for a sufficient time to remove the surface to a sufficient depth that underlying scratches and regions of stress and disorder are substantially removed.

2. The process according to claim 1 in which the surface is lapped and mechanically polished prior to being contacted with the vanadium pentoxide melt.

3. The process according to claim 1 in which the member is kept substantially stationary whilst the surface is in contact with the vanadium pentoxide melt.

4. The process according to claim 1 in which after being contacted with the vanadium pentoxide melt the member is washed in hot concentrated hydrochloric acid, is washed in distilled water, is washed in alcohol and then is dried in air.

5. The process according to claim 1 in which the surface is given a final mechanical polish with diamond dust having a particle size in the range of from 0.2 $\mu$m. to 0.8 $\mu$m.

6. The process according to claim 1 in which the contacting of the surface of the member with a vanadium pentoxide melt is carried out in a plurality of stages, in each of which a fresh vanadium pentoxide melt is used.

7. A process for the treatment of crystalline aluminum oxide in which at least one surface of a crystalline aluminum oxide member is contacted with a vanadium pentoxide melt having a temperature in the range of from 800° C. to 1,000° C. until a depth of surface of at least 30 $\mu$m. has been removed.

8. The process according to claim 7 in which the surface is lapped and mechanically polished prior to being contacted with the vanadium pentoxide melt.

9. The process according to claim 8 in which the surface is given a final mechanical polish with diamond dust having a particle size in the range of from 0.2 $\mu$m. to 0.8 $\mu$m.

10. The process according to claim 7 in which the member is kept substantially stationary whilst the surface is in contact with the vanadium pentoxide melt.

11. The process according to claim 7 in which after being contacted with the vanadium pentoxide melt the member is washed in hot concentrated hydrochloric acid, is washed in distilled water, is washed in alcohol and then is dried in air.

12. The process according to claim 7 in which the contacting of the surface of the member with a vanadium pentoxide melt is carried out in a plurality of stages, in each of which a fresh vanadium pentoxide melt is used.